United States Patent [19]

Rogerson

[11] Patent Number: 5,405,166
[45] Date of Patent: Apr. 11, 1995

[54] AIR BAG WITH INFLATION LIMITER

[75] Inventor: William Rogerson, Rochester Hills, Mich.

[73] Assignee: AlliedSignal Inc., Morristown, N.J.

[21] Appl. No.: 100,017

[22] Filed: Jul. 30, 1993

[51] Int. Cl.⁶ .............................. B60R 21/30
[52] U.S. Cl. .................... 280/739; 280/728 R; 280/743 R; 280/743 A
[58] Field of Search ............. 280/743 A, 743 R, 742, 280/729, 728 R, 739

[56] References Cited

U.S. PATENT DOCUMENTS

| | | | |
|---|---|---|---|
| 3,879,056 | 4/1975 | Kawashima et al. | 280/743 A |
| 3,907,327 | 9/1975 | Pech | 280/743 A |
| 5,048,863 | 9/1991 | Henseler et al. | 280/743 R |
| 5,246,250 | 9/1993 | Wolanin et al. | 280/742 |
| 5,249,824 | 10/1993 | Swann | 280/729 |

FOREIGN PATENT DOCUMENTS 1-311930 12/1989 Japan .................... 280/729

Primary Examiner—Eric D. Culbreth
Attorney, Agent, or Firm—Markell Seitzman

[57] ABSTRACT

An air bag (32) adapted to be inflated comprising: an inlet portion (36) to receive inflation gas and a flexible walled portion (34,40) including at least one first vent hole (42) therein; a flexible member (50), joined at one end thereof to the walled portion on one side of the first vent hole and at another end thereof to the walled portion on an opposite side of the first vent hole, the flexible member including at least a second vent hole, expansion joints (60,70,62,72), formed in the flexible member and the walled portion for maintaining the first and second vent holes aligned during an initial phase of inflation so as to provide exhaust port (44) through which inflation gas may exit and for permitting the first and second holes to move relatively to one another during continued inflation so as to close of the exhaust port.

1 Claim, 1 Drawing Sheet

AIR BAG WITH INFLATION LIMITER

BACKGROUND AN SUMMARY OF THE INVENTION

The present invention generally relates to an air bag and more specifically to a means for controlling the inflation rate of the air bag.

As it is known in the art, the air bag must be able to be filled rapidly to protect the occupant but slow enough to limit the forces imparted to the occupant, especially the out-of-position occupant. Various techniques have been suggested, in the prior art, to control the rate of inflation of an air bag as well as the trajectory it will take upon inflation. Such techniques include controlling the rate at which an inflator provides inflation gas, using tethers which effectively slows inflation, the use of coated, partially coated and or uncoated fabric with various levels of porosity which permit some of the inflation gas to be exhausted. As can be appreciated, it is desirable to be able to control the rate of the air bag inflation, such that its impact especially with an out-of-position occupant is within certain design limits. The present invention is directed to one such means of controlling the rate of inflation.

Accordingly, the invention comprises: an air bag adapted to be inflated comprising: an inlet portion to receive inflation gas and a flexible walled portion including at least one first vent hole therein. A flexible member is joined at one end thereof to the walled portion on one side of the first vent hole and at another end thereof to the walled portion on an opposite side of the first vent hole. The flexible member includes at least a second vent hole. The air bag includes first means, formed in the flexible member and the walled portion for maintaining the first and second vent holes aligned during an initial phase of inflation so as to provide exhaust port through which inflation gas may exit and for permitting the first and second vent holes to move relatively to one another during continued inflation so as to close the exhaust port. In the preferred embodiment of the invention, the first means includes a plurality of expansion joints formed in both the walled portion of the air bag and in the flexible member. As the air bag continues to inflate, the aligned vent holes are permitted to move relative to one another as the expansion joints expand so as to effectively close gas flow therethrough.

Many other objects and purposes of the invention will be clear from the following detailed description of the drawings.

DETAILED DESCRIPTION OF THE DRAWINGS

Figure 1:
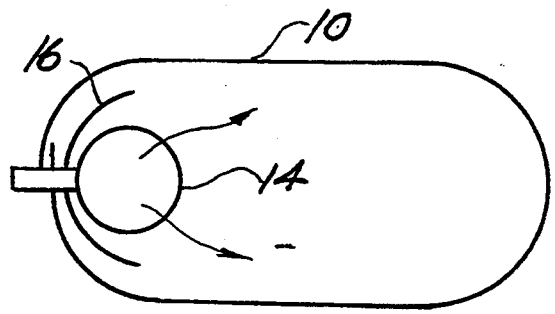
FIGS. 1 and 2 illustrates the construction of a typical prior art passenger side and driver side air bag installation.
Figure 2:
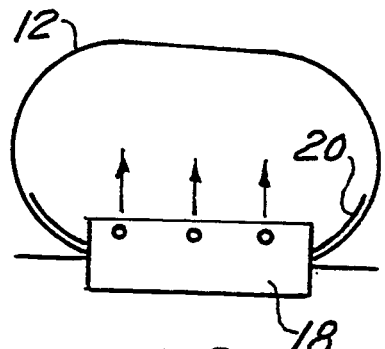

Reference is briefly made to FIGS. 1 and 2 which illustrate the construction of a passenger side air bag 10 and driver side air bag 12. These air bags are shown diagrammatically. It is well known that the air bags may comprise one or more pieces of fabric typically sewn together to achieve a desired shape. With regard to FIG. 1, there is also diagrammatically shown a gas inflator 14 about which the air bag 10 is secured. A reinforcement or heat shield layer 16 of fabric is often provided to shield the air bag 10 from the heated gases exiting the inflator. FIG. 2 illustrates a typical installation of the driver side air bag 12. An inflator 18 is shown with a heat shield 20 protecting the air bag 12. As it is known in the art, the time that it takes to inflate an air bag is measured in a few milliseconds. During this time the relatively light air bag material is quickly propelled outwardly to protect the occupant. An occupant who is positioned too close to the instrument panel in the case of a passenger side air bag or too close to the steering wheel in the case of a driver side air bag is often referred to as an "out-of-position occupant". The forces imparted to such an occupant by an air bag could be relatively high. As mentioned, various means presently exists to reduce the initial impact between the air bag and the out-of-positioned occupant, such as by throttling or limiting the initial rate at which the inflator fills the air bag or alternatively tethers which add complexity and cost.

Figure 3:
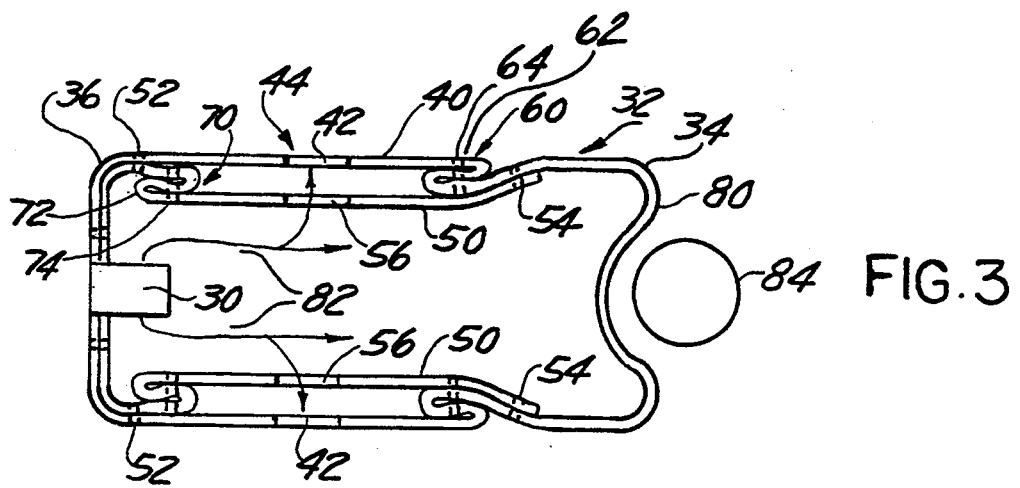
FIGS. 3 and 4 illustrates an air bag comprising the present invention.
Figure 4:
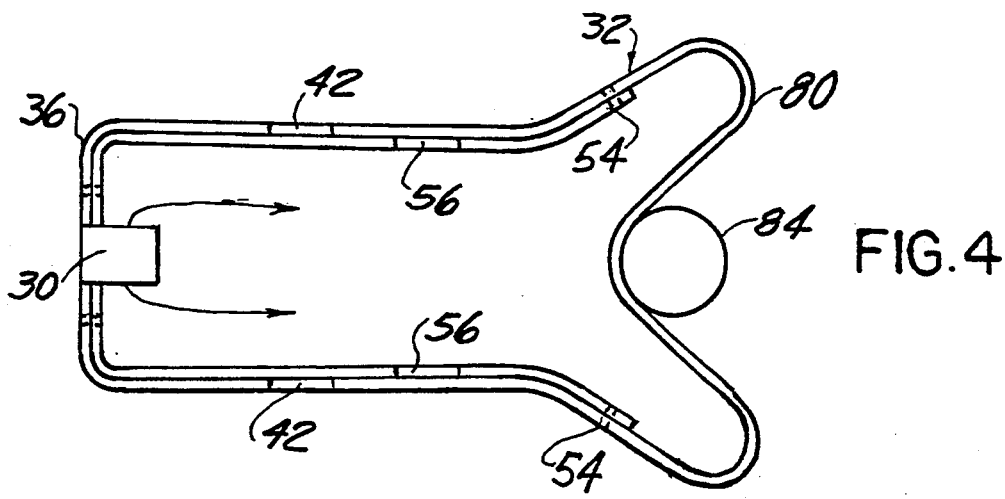

FIGS. 3 and 4 illustrates top views of an inflating air bag constructed in accordance with the present invention. In FIG. 3, an out-of-position occupant is impacted by the air bag prior to it being fully inflated. In FIG. 4, the air bag is fully inflated. Schematically illustrated is an inflator 30 which may be a passenger or driver side inflator. The air bag 32 comprises a cushion portion 34 and an inlet portion, generally shown as 36. Positioned in a portion of the air bag, typically in a side wall 40 thereof is a first vent hole 42. As used herein, the side wall can be on a horizontal or vertical wall portion of the bag. A flexible layer of material is attached to the air bag 32 at a location 54 upstream of the vent hole 42 such as by sewing. The flexible member attached to the air bag at a downstream location (closer to the occupant), relative to the vent hole 42 such as by sewing. It should be appreciated that physical attachment of the flexible member to the air bag upstream of the vent hole 42 is not necessary as long as the the corresponding end of the flexible member is fixed. As such, the flexible member can be fixed to the air bag, or for example, secured to or by the inflator 30. The flexible layer may be made of the same material as the air bag or other fabric such as seat belt webbing, or a layer of plastic. The flexible member additionally includes at least one other vent hole 56. The air bag is provided with means which in the preferred embodiment are formed in both the flexible member and the side wall, which maintains the first and second vent holes 42 and 56 respectively aligned during the initial phase of air bag inflation so as to provide for an exhaust port 44 through which a portion of the inflation gas may exist, and additionally permitting the first and second vent holes to move relative to one another upon continued inflation of the air bag so as to close off the exhaust port. In the preferred embodiment of the invention, this means is accomplished by forming within the side wall portion 40 of the air bag an expansion joint generally shown as 60. The expansion joint is constructed by forming a pleat in the air bag generally at location 62. The pleat is initially maintained together by a plurality of sewing stitches 64 which tears apart during the continued inflation of the air bag permitting the side wall portion to increase to its fully extended length. This means also includes a second expansion joint 70 formed in the flexible member 50. In the preferred embodiment of the invention, the second expansion joint 70 includes a second pleat formed at location 72 and held together by a second plurality of stitches generally shown as 74. It should appreciated that the first and second vent holes as well as the various first and second expansion joints can be formed on one or the other side of the air bag or alternatively on the top and bottom of the air bag. The effective area of the exhaust port, that is, the aligned areas of the first 42 and second 46 vent holes is chosen large enough to reduce bag pressure and limit forces on the occupant to a safe level. Vent holes having a two (2) inch (5.08 cm) diameter have demonstrated satisfactory results. It should also be appreciated that in addition to using one vent hole formed in the air bag and another formed in the flexible member that a plurality of vent holes may be used provided that the total area is equal to the desired value.

As mentioned above, FIG. 3 illustrates a partially inflated air bag. As can be seen, the frontal surface 80 of the air bag has made contact with an out-of-positioned occupant 84. This contact temporarily limits the expansion of the air bag. In this condition, the air bag has unfolded, from its folded, stored configuration, sufficiently to expose the aligned first 42 and second 56 vent holes such that inflation gases (see arrow 82) are permitted to flow through these vent holes thereby effectively limiting the rate at which the initial phase of inflation takes place. The direct effect of this limiting of the rate of inflation is to limit the forces imparted to the occupant. FIG. 4 shows a fully inflated air bag. Diagrammatically, FIG. 4 could be illustrative of the situation in which the out-of-position occupant has been urged rearwardly by the air bag or illustrative of a fully inflated air bag and a properly seated occupant. In any case, as the air bag continues to inflate, the tear seams formed by the stitches 64 and 74 are opened, which permits expansion joints 60 and 70 to expand. Upon further inflation of the air bag, and as the wall portion 40 and the flexible member 50 continue to expand they will achieve a relative orientation as shown in FIG. 4, in which the first vent hole 42 and the second vent hole 56 are offset with the side wall and flexible member urged against each other by the internal pressure of the air bag thereby prohibiting or severely restricting further egress of inflation gases through these vent holes permitting the inflation rate of the air bag to increase. It should also be appreciated as the vent holes 56 move relative to the vent hole 42, the effective area therebetween varies so as to variably reduce the amount of inflation gas permitted to exit thereto.

Many changes and modifications in the above described embodiment of the invention can, of course, be carried out without departing from the scope thereof. Accordingly, that scope is intended to be limited only by the scope of the appended claims.

It is claimed:

1. An air bag adapted to be inflated comprising:
   an inlet portion to receive inflation gas and an expandable flexible wall portion including at least one hole defining at least one first vent hole therein;
   an expandable, flexible member, joined at one end thereof to the wall portion on one side of the first vent hole, the flexible member including at least a second vent hole, and at another end thereof fixed in place on an opposite side of the first vent hole;
   first means formed in the expandable, flexible member and the wall portion for maintaining the first and second vent holes aligned during an initial phase of inflation so as to provide exhaust port means through which inflation gas may exit and for permitting the first and second holes to move relatively to one another during continued inflation so as to close off the exhaust port means, including a first expansion joint formed in the wall portion for permitting the wall portion to move from a first length to a second length and in so doing to adjust the relative position of the first and second vent holes;
   wherein the first expansion joint of the wall portion is located on one side of the first vent hole and wherein a second expansion joint is located on an opposite side of the first vent hole in the flexible member.

* * * * *